United States Patent [19]
Nelson et al.

[11] 3,984,332
[45] Oct. 5, 1976

[54] RADIATION DETECTION SYSTEM

[75] Inventors: Melvin A. Nelson; Terence J. Davies, both of Santa Barbara; John R. Morton, III, Livermore, all of Calif.

[73] Assignee: The United States of America as represented by the United States Energy Research and Deveopment Administration, Washington, D.C.

[22] Filed: July 7, 1975

[21] Appl. No.: 593,408

[52] U.S. Cl. .............................. 250/368; 250/361 R
[51] Int. Cl.² ............................................ G01T 1/22
[58] Field of Search ............ 250/361, 362, 368, 397

[56] References Cited
UNITED STATES PATENTS

| | | |
|---|---|---|
| 2,448,963 | 9/1948 | Dicke................................. 250/368 |
| 3,049,619 | 8/1962 | Genovese, Jr. ..................... 250/362 |
| 3,140,394 | 7/1964 | Roberts............................... 250/368 |
| 3,600,578 | 8/1971 | Porges et al. .................... 250/379 X |

Primary Examiner—Archie R. Borchelt
Attorney, Agent, or Firm—Dean E. Carlson; John A. Koch

[57] ABSTRACT

A radiation detection system which utilizes the generation of Cerenkov light in and the transmission of that light longitudinally through fiber optic wave guides in order to transmit intelligence relating to the radiation to a remote location. The wave guides are aligned with respect to charged particle radiation so that the Cerenkov light, which is generated at an angle to the radiation, is accepted by the fiber for transmission therethrough. The Cerenkov radiation is detected, recorded, and analyzed at the other end of the fiber.

9 Claims, 2 Drawing Figures

RADIATION DETECTION SYSTEM

BACKGROUND OF THE INVENTION

The invention described herein was made in the course of or under Contracts E(29-1)-1183 and W-7405-ENG-45 with the U.S. Energy Research and Development Administration.

This invention relates to radiation detection and more particularly to the detection of radiation and the transmission of intelligence corresponding to the radiation to a remote location for recording and other processing.

The detection of the radiation of charged particles, x-rays, gamma rays, neutrons, and the like is commonly accomplished utilizing a transducer which responds to the radiation in a manner which can be used to generate an electrical signal which corresponds to some characteristic of the radiation. The electrical signal is transmitted over electric cables, commonly coaxial cables, to a location remote from the transducer for display and/or recording and other processing.

The Cerenkov effect has been used for many years to detect charged particles moving at velocities near the speed of light. When a charged particle moves through a material such as water or glass with a velocity exceeding the speed of light in that material, light is emitted in a cone surrounding the particle trajectory. This phenomenon is well known, and is in some respects similar to the V-shaped bow waves produced by a speed boat which exceeds the velocity of water waves. Detecting and measuring this Cerenkov light provides information about the generating source. The cone of emitted light is at an angle, $\theta$, to the particle trajectory where $$\cos \theta = \frac{1}{n(v/c)}$$

where $n$ is the refractive index of the medium, $v$ is the velocity of the particle, and $c$ is the speed of light.

Because of the unique geometric properties of generated Cerenkov light, a variety of optical designs have been designed to collect the light efficiently and deliver it, with a minimum of dispersion in time, to a photodetector and recording system. Carefully prepared blocks of glass or plastic, sometimes augmented with lenses or mirrors, are conventionally mounted together with photomultiplier tubes to form a modular unit. The photomultiplier tube converts the radiation-augmented Cerenkov light to an electrical signal that can be sent down a coaxial cable to a remote recording device. Such an assembly of optical material and photodetector is generally referred to as a Cerenkov counter. These devices are bulky, expensive, delicate, and may ultimately be limited in performance by the transmission characteristics of the electrical cables which carry the signal to the recording device. Over distances of more than a few feet, these cables can materially distort the information contained in pulses of shorter duration than about 5 nanoseconds. In addition, the cables are sensitive to electromagnetic and other electrical noise often generated by Cerenkov radiation sources. This noise makes detection difficult and limits accuracy of measurement. Environmental effects such as radiation or high temperature may also restrict the use of the conventional Cerenkov counter/cable system.

SUMMARY OF THE INVENTION

Accordingly, it is an object of the invention to provide a radiation detection system which utilizes the Cerenkov effect but which provides a number of advantages over the conventional Cerenkov counter/cable system.

Briefly summarized, the above and additional objects are accomplished by subjecting one end of a length of an optical fiber to radiation of charged particles in a manner whereby Cerenkov light is generated in and transmitted through the fiber. The transmitted light is detected at the other end of the fiber to provide intelligence on the charged particle radiation.

Fibers of glass and plastic have been developed which allow light beams to be directed along a desired path with very low losses and with very little distortion of fast pulses. The transmission of light through such optical fibers is analogous to the use of metal wave guides to direct electromagnetic radiation below infrared frequencies along a desired path. For example, graded index fibers of fused silica, available as a commercial item from the Corning Glass Works of Corning, New York, and others, are able to transmit light for 0.5 km with intensity transmission of better than 30 percent and time dispersion of less than 0.5 nsec.

Since the fiber is composed of a material of high refractive index ($n = 1.46$ for fused silica), the fiber itself functions as the Cerenkov detector medium in the system according to the invention. The end of the fiber subjected to the charged particle radiation is oriented with respect to that radiation so that the radiation-generated Cerenkov light is accepted by the fiber for transmission therethrough. Since, as previously discussed, the Cerenkov light is generated at an angle $\theta$ to the direction of the radiation, the end of the fiber is oriented with respect to the radiation at an angle equal to $\theta$ plus or minus the acceptance angle of the fiber. Accordingly, a significant quantity of light will be emitted unidirectionally within the acceptance angle of the fiber.

This efficiently coupled light is transmitted down the fiber to suitable detecting and recording apparatus. The fiber provides high-frequency response superior to electrical cables; optical loss is so small that high-frequency signals on the order of 1 GHz can be transmitted over several kilometers. At the same time, this combined transducer and transmission medium can be less than ⅛ inch in diameter while providing an output signal less distorted by electrical interference, temperature extremes, short circuits, and nuclear radiation than conventional electrical cables. Its optical output can be detected and recorded using any of a number of conventional approaches such as phototube/oscilloscope apparatus, an image converter camera, a spectrograph/photographic film recorder, or other optical counting or recording devices.

While multimode step-index fibers and graded-index fibers have been specifically demonstrated in the system according to the invention, other fiber types are undoubtedly also suitable.

Where the radiation to be detected is not charged particles, it is converted into charged particles radiation which is utilized to generate Cerenkov radiation in the fibers. For instance, where the radiation of interest is gamma rays or x-rays, a conventional gamma-electron or x-ray to electron converter can be employed to convert the rays into electrons. Where the radiation of interest is composed of neutrons, a fission plate converter to charged particles can be employed.

In addition to use in applications where conventional Cerenkov counters have been used heretofore, the system according to the invention is well suited for a number of additional applications. For example, it may be used to map radiation fields by probing a small area with a single fiber, or by using a matrix of many fibers simultaneously. A compact array of fibers would provide a "radiation camera" for viewing images formed by charged particle radiation. The system is well adapted for high-speed monitoring of radiation levels in a hostile environment. For example, a number of fibers could be placed in and around a nuclear reactor and could be used either for quantitative control or qualitative visual monitoring. Even very high-speed data can be transmitted to a remote monitoring location.

The above-mentioned and additional objects, advantages, and applications of the invention and a further understanding of the invention will be apparent after consideration of the following description of a preferred embodiment described in conjunction with the accompanying drawing.

DESCRIPTION OF PREFERRED EMBODIMENT

Figure 1:
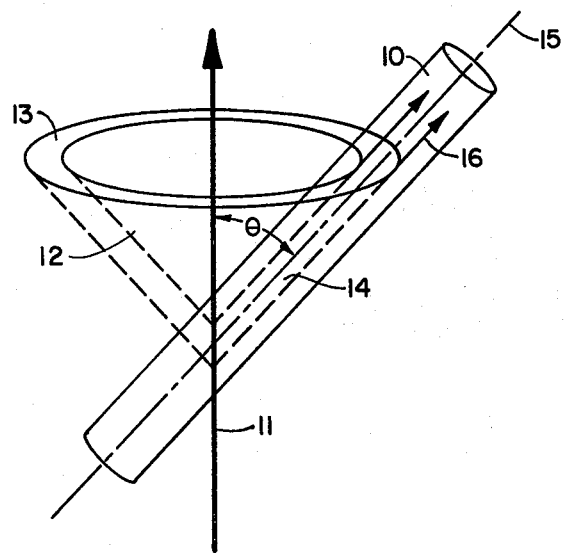
FIG. 1 is a schematic representation of the Cerenkov effect developed in a fiber optic wave guide.

Referring now to FIG. 1, the generation of Cerenkov light upon the subjection of fiber optic light guide 10 to charged particle radiation 11 at the Cerenkov angle $\theta$ is schematically illustrated. With a typical fiber 10 having a refractive index of $n = 1.466$, angle $\theta$ would be about 47° as can be calculated from the $\cos\theta$ formula previously set out.

The total Cerenkov radiation produced would be in the form of a cone 12 having a relatively narrow envelope 13 of radiation in the light region of the electromagnetic spectrum bounded at the ultraviolet end of the spectrum by the wavelength at which the fiber index decreases to 1.0, and at the infrared end by the wavelength region of anomalous dispersion where the index approaches infinity. The portion 14 of envelope 13 which lies generally along axis 15 of fiber 10, within the acceptance angle $\phi$ of the fiber, is transmitted down the fiber as indicated by direction arrows 16.

Although for simplicity of description, FIG. 1 illustrates the case where the direction of the Cerenkov radiation within fiber 10 is parallel to axis 15, it will be appreciated that direction 16 could diverge from axis 15, the maximum divergence being the acceptance angle $\phi$ of the particular fiber 10. Within acceptance angle $\phi$, essentially all of the light 14 at angle $\theta$ is transmitted down fiber 10 diminishing to cutoff at $\theta \pm \phi$. The mechanism by which light misaligned with fiber axis 15 up to the acceptance angle $\phi$ of the fiber is transmitted down the fiber is by total internal reflection in step index fibers and by a continuous focusing process in graded index fibers.

Figure 2:
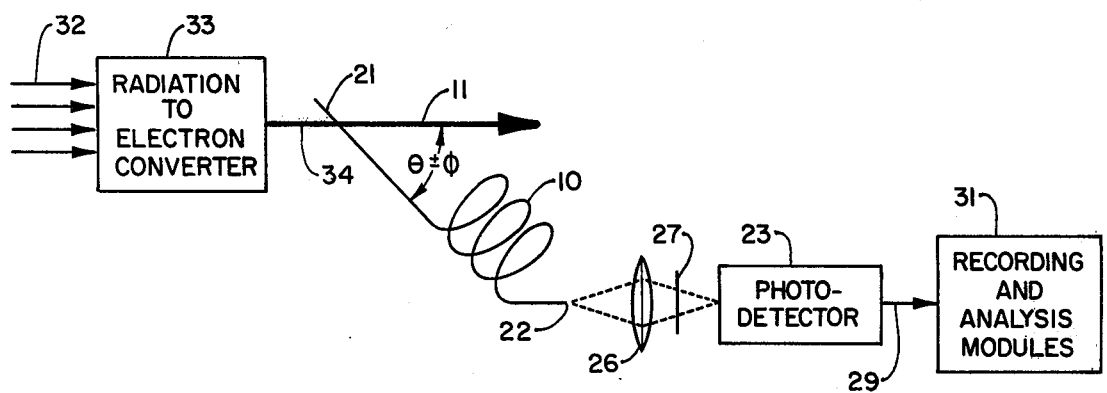
FIG. 2 is a schematic representation of a system for utilizing the Cerenkov effect in accordance with the invention.

Referring now to the combination of components of the system of FIG. 2, one end 21 of light guide 10 is aligned with charged particle radiation 11 within an angle equal to $\theta \pm \phi$ to achieve the transmission of Cerenkov light down guide 10 in the manner described above in connection with FIG. 1. The light emitted from the other end 22 of guide 10 is detected by photodetector 23 after appropriate conditioning, if necessary or desired, such as by focusing lens 26 and filter 27. A narrow band optical filter 27 can be utilized to restrict the frequencies observed by detector 23 in order to improve the time resolution of the time of arrival of the pulse seen by detector 23. The combined effects of mode and material dispersion in the fibers effect a significant pulse broadening. In demonstrations of the system utilizing fibers 500 m long, initial < 120-psec input Cerenkov pulses generated at a point 1.0 cm from the end of the fiber by a 50-psec, 4-ampere burst of 20-Mev electrons were broadened to about 16 nsec (FWHM). In a graded index fiber, the time dispersion was reduced from 16 nsec to about 1.6 nsec by using a filter 27 to reduce the spectral width to 5 nm. In a step index fiber, reducing the spectral width to 10 nm by use of a filter 27 reduced the time dispersion to 4 nsec.

Efforts to effect further reductions in time dispersion by further reductions in spectral width were unsuccessful in the later case; the residual dispersion apparently being modal. However, a reduction in the time dispersion up to and even less than 0.5 nsec is believed possible in graded index fibers. The mode dispersion of a graded index fiber 500 m long has been shown to be less than 0.5 nsec by use of a Yag laser. However, in the demonstration of the system referred to above, efforts to utilize a filter narrower than 5 nm were unsuccessful due to the resultant signal level being below the detection limit of the particular photodetector 23 utilized in those demonstrations.

Accordingly, whereas both multimode step index and graded index fibers have been demonstrated to be suitable radiation-to-optical converters and optical transmission lines, the much lower modal dispersion of the graded index fibers will make them the preferred choice for application where the maximum reduction in time dispersion is required.

Output 29 of photodetector 23 would be recorded, displayed, and/or analyzed by modules 31 to obtain information relating to beam 11. That information includes the time and intensity variations of the radiation beam 11 generating the Cerenkov light in fiber end 21, as modified by the dispersion and transmission properties of the guide 10, filter 27, and photodetector 23. Where detector 23 is a photodiode or photomultiplier, the electrical signal output 29 of detector 23 would be a current that is proportional to the time and intensity variations of the light emitted from the guide 10 and through filter 27.

In instances where the radiation of interest 32 is not composed of charged particles which will produce the Cerenkov effect in fiber 10 directly, a converter 33 is utilized to produce charged particle beam 11. As previously discussed, converter 33 could be a fission plate, for example, in order to effect conversion of neutrons 32 making up radiation to charged particles 11, the charged particles 11 being employed to generate Cerenkov light in fiber 21. Where radiation 32 is composed of x-rays or gamma rays, an x-ray to electron or gamma ray to electron converter could be used at 33.

The distance 34 between fiber end 21 and beam source 38 is made as small as practicable in any particular application in order to minimize spreading of beam 11 and the decrease in velocity that beam 11 suffers in air.

While the fundamental novel features of the invention have been shown and described and pointed out as applied to particular embodiments by way of example, it will be appreciated by those skilled in the art that various omissions, substitutions, and changes may be made within the principle and scope of the invention as expressed in the appended claims.

What we claim is:

1. In a system for detecting radiation at one location and transmitting intelligence relating to said radiation to a second location the combination comprising:
    a. a length of a fiber optic light guide extending between said two locations, one end of said fiber being positioned to intersect charged particle radiation at an angle $\theta$ plus or minus the angle $\phi$ to the longitudinal axis of said fiber where $\theta$ is defined by the formula $$\cos \theta = \frac{1}{n(v/c)}$$

where $n$ is the refractive index of the fiber, $v$ is the velocity of the charged particle and $c$ is the speed of light, and $\phi$ is the acceptance angle of the fiber whereby Cerenkov light is generated therein and the portion of the cone of said Cerenkov light which lies generally along said longitudinal axis is transmitted through said fiber and
    b. photodetector means positioned at the other end of said fiber for detecting light thereat.

2. The combination of claim 1 including means for converting the radiation to be detected into said charged particle radiation.

3. The combination of claim 1 including an optical lens positioned at said other end of said fiber for focusing light therefrom onto said photodetector means.

4. The combination of claim 2 including an optical lens positioned at said other end of said fiber for focusing light therefrom onto said photodetector means.

5. The combination of claim 4 including means for recording the output of said photodetector.

6. The combination of claim 5 including a filter means at said other end for reducing the time dispersion of the light pulse detected.

7. In a system for detecting radiation at one location and transmitting intelligence relating to said radiation to a second location, the method comprising:
    a. providing a length of a fiber optic light guide between said two locations,
    b. positioning one end of said fiber to intersect charged particle radiation at the Cerenkov angle plus or minus the acceptance angle of said fiber whereby the portion of the cone of Cerenkov light produced thereby which lies generally along the longitudinal axis of said fiber is transmitted down the fiber, and
    c. detecting said light transmitted through said fiber at the other end thereof.

8. The method of claim 7 including the step of converting the radiation to be detected into charged particle radiation.

9. The method of claim 8 including the steps of focusing and filtering said transmitted light prior to said detecting step.

* * * * *